(12) United States Patent
Lee et al.

(10) Patent No.: US 10,325,429 B2
(45) Date of Patent: Jun. 18, 2019

(54) CARD-TYPE SMART KEY AND CONTROL METHOD THEREOF

(71) Applicants: HYUNDAI MOTOR COMPANY, Seoul (KR); KIA MOTORS CORPORATION, Seoul (KR); Hyundai Mobis Co., Ltd., Seoul (KR)

(72) Inventors: Sang Min Lee, Suwon-si (KR); Sung Ryul Cha, Suwon-si (KR); Duk Yun Cho, Suwon-si (KR)

(73) Assignees: Hyundai Motor Company, Seoul (KR); Kia Motors Corporation, Seoul (KR); Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 15/816,563

(22) Filed: Nov. 17, 2017

(65) Prior Publication Data
US 2018/0300972 A1    Oct. 18, 2018

(30) Foreign Application Priority Data
Apr. 18, 2017 (KR) .................. 10-2017-0049577

(51) Int. Cl.
*G07C 9/00* (2006.01)
*G08C 17/02* (2006.01)
*B60R 25/24* (2013.01)

(52) U.S. Cl.
CPC ...... *G07C 9/00111* (2013.01); *G07C 9/00119* (2013.01); *G08C 17/02* (2013.01); *B60R 25/24* (2013.01); *B60R 2325/105* (2013.01); *G08C 2201/12* (2013.01); *G08C 2201/94* (2013.01)

(58) Field of Classification Search
CPC .................. G07C 9/00111; G07C 9/00119
USPC .................................. 340/5.6–5.64
See application file for complete search history.

(56) References Cited

U.S. PATENT DOCUMENTS

| 8,928,455 | B2 | 1/2015 | Idsoe | |
|---|---|---|---|---|
| 10,032,365 | B1* | 7/2018 | Xu | G08C 17/02 |
| 10,037,452 | B2* | 7/2018 | Han | G06F 3/041 |
| 2006/0189367 | A1* | 8/2006 | Nguyen | G07F 17/32 |
| | | | | 463/16 |
| 2009/0114079 | A1* | 5/2009 | Egan | G09B 15/023 |
| | | | | 84/477 R |
| 2009/0256677 | A1* | 10/2009 | Hein | B60R 25/00 |
| | | | | 340/5.72 |
| 2013/0012268 | A1* | 1/2013 | Whang | G06F 3/04895 |
| | | | | 455/563 |

(Continued)

FOREIGN PATENT DOCUMENTS

| JP | 2010-015793 A | 1/2010 |
|---|---|---|
| JP | 2011-146297 A | 7/2011 |

(Continued)

*Primary Examiner* — Allen T Cao
(74) *Attorney, Agent, or Firm* — Morgan, Lewis & Bockius LLP (57) ABSTRACT

A card-type smart key includes at least one button, at least one touch sensor disposed around the at least one button, and a controller for receiving at least one input from the at least one button and the at least one touch sensor, wherein, upon sensing manipulation of any one of the at least one button and then sensing touch from a touch sensor disposed around the manipulation-sensed button, the controller performs a function corresponding to the manipulation.

17 Claims, 6 Drawing Sheets

(56) References Cited

U.S. PATENT DOCUMENTS

| | | | |
|---|---|---|---|
| 2015/0350413 A1* | 12/2015 | Ma | H04M 1/72577 455/418 |
| 2016/0061613 A1* | 3/2016 | Jung | G01C 21/3632 701/49 |
| 2016/0154464 A1* | 6/2016 | Croisonnier | G06F 3/017 345/168 |

FOREIGN PATENT DOCUMENTS

| | | |
|---|---|---|
| KR | 10-0996646 B1 | 11/2010 |
| KR | 10-2013-0005582 A | 1/2013 |
| KR | 10-1542000 B1 | 8/2015 |
| KR | 10-2016-0124059 | 10/2016 |
| WO | 2016-0081015 A1 | 5/2016 |

\* cited by examiner

CARD-TYPE SMART KEY AND CONTROL METHOD THEREOF

This application is based on and claims the benefit of priority to Korean Patent Application No. 10-2017-0049577, filed on Apr. 18, 2017 with the Korean Intellectual Property Office, the entire disclosure of which is incorporated herein by reference.

TECHNICAL FIELD

The present disclosure relates to a card-type smart key and a control method thereof and, more particularly, to an apparatus for preventing incorrect operation caused by incorrect manipulation of a button and a control method for reducing battery consumption by applying an additional sensor for preventing incorrect manipulation.

BACKGROUND

A conventional card-type smart key may be implemented in a thin and flat form relative to a fob-type smart key so that it is easy for a user to carry.

Figure 1:
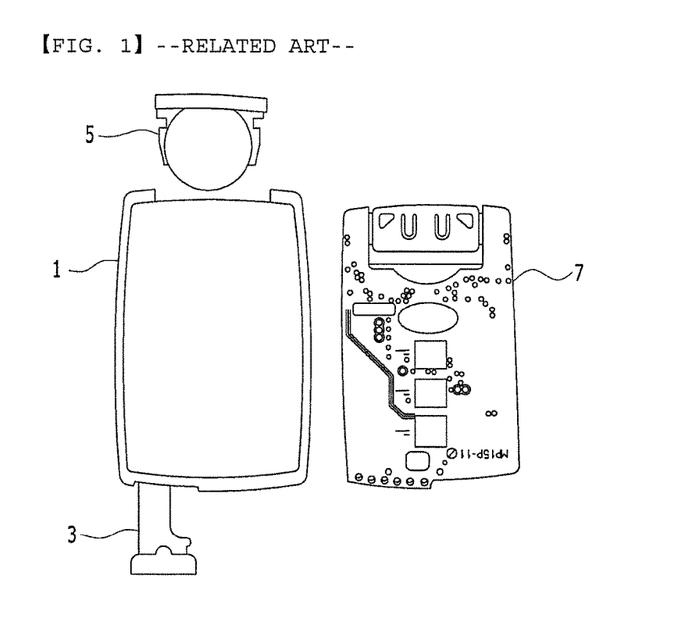
FIGS. 1 and 2 are views illustrating a conventional card-type smart key.
Figure 2:
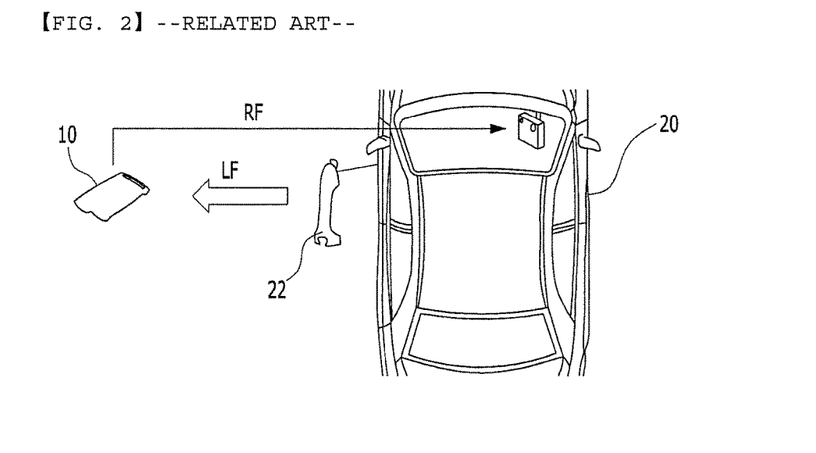

FIGS. 1 and 2 are views illustrating a conventional card-type smart key.

A conventional card-type smart key 10 may include a mechanical key 3, a battery 5, and a printed circuit board (PCB) 7 which are inside a housing 1 of a card type. The card-type smart key 10 may accommodate the mechanical key 3 and the battery 5 inside the housing 1 of the card type. However, generally, this card-type smart key does not include key buttons because a security problem may occur due to incorrect operation in implementing a remote key entry (RKE) function for remotely controlling a door by applying the buttons.

Therefore, the conventional card-type smart key implements only a passive access function for controlling a door of a vehicle only by buttons of the vehicle after a user approaches the vehicle.

Hereinafter, the passive access function will be described.

If the conventional card-type smart key 10 is located within a preset distance from a vehicle 20, the card-type smart key 10 may receive a low frequency (LF) signal from an external antenna. The LF signal may be an LF signal corresponding to at least one of a door lock button, a door unlock button, and a trunk or tail gate open button of the vehicle 20.

Upon receiving the LF signal, the smart key 10 may generate a radio frequency (RF) signal corresponding to the received LF signal. The vehicle 20 may receive the RF signal generated by the conventional card-type smart key 10 may perform a function corresponding to the LF signal.

For example, when a door open button attached to a door handle of the vehicle 20 operates, the conventional card-type smart key 10 may receive an LF signal corresponding to a door open function from the vehicle 20 and output a door open signal corresponding to the LF signal to the vehicle 20 as an RF signal.

SUMMARY

Accordingly, the present disclosure is directed to a card-type smart key and a control method thereof that substantially obviate one or more problems due to limitations and disadvantages of the related art.

An object of the present disclosure is to provide a card-type smart key for preventing incorrect operation according to manipulation thereof and a control method thereof.

More specifically, the object of the present disclosure is to provide a card-type smart key for solving incorrect operation of a vehicle due to incorrect button manipulation and reducing battery consumption by applying an additional sensor for preventing incorrect button manipulation in maintaining material and exterior specifications of the key and implementing an RKE function, and a control method thereof.

The objects that can be achieved through the present disclosure are not limited to what has been particularly described hereinabove and other technical objects not described herein will be more clearly understood by persons skilled in the art from the following detailed description.

To achieve these objects and other advantages in accordance with the purpose of the invention, as embodied and broadly described herein, a card-type smart key includes at least one button, at least one touch sensor disposed around the at least one button, and a controller for receiving at least one input from the at least one button and the at least one touch sensor, wherein, upon sensing manipulation of any one of the at least one button and then sensing a touch from a touch sensor disposed around the manipulation-sensed button, the controller performs a function corresponding to the manipulation.

The at least one button may be disposed under a symbol according to each function.

If the at least one button are plural buttons, the plural buttons may be separated from each other by a preset distance.

The at least one touch sensor may be disposed surrounding the at least one button.

The at least one touch sensor may have dimensions identical to dimensions of the at least one button.

The at least one touch sensor may be a capacitive touch sensor.

The at least one touch sensor may be disposed to sense a voltage value of a touch sensor around the at least one button when the at least one button is input.

The controller may wake the at least one touch sensor corresponding to the at least one button when the at least one input through the at least one button satisfies a preset condition.

The controller may receive a voltage sensed by the wakened touch sensor and determine input of a user based on the sensed voltage.

In another aspect of the present disclosure, a method of controlling a card-type smart key includes receiving user input from at least one button, receiving at least one input from the at least one button and the at least one touch sensor, and upon sensing manipulation of any one of the at least one button and then sensing a touch from a touch sensor disposed around the manipulation-sensed button, performing, by a controller, a function corresponding to the manipulation.

If the at least one button are plural buttons, the method may further include determining, by the controller, whether inputs from the plural buttons are simultaneously received.

If the at least one input from the at least one button is received, the method may further include determining, by the controller, whether an input time surpasses a preset filtering time.

The method may further include determining, by the controller, whether a voltage value sensed by the at least one touch sensor is changed to a preset threshold value or more.

The method may further include determining, by the controller, whether the voltage value sensed by the at least one touch sensor is changed to a specific pattern.

The method may further include cancelling, by the controller, the at least one input of the at least one button upon generating a control signal for performing the function.

Upon cancelling the at least one input of the at least one button, the method may further include receiving, by the controller, a voltage value from the at least one touch sensor around a button which is not pressed.

The method may further include setting, by the controller, the voltage value sensed by the at least one touch sensor to a threshold value for a next operation.

When there is no button that is not pressed, the method may further include setting, by the controller, the at least one touch sensor to a power saving state.

It is to be understood that both the foregoing general description and the following detailed description of the present disclosure are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION

Hereinafter, various apparatuses and methods to which the embodiments of the present disclosure are applied will be described in detail with reference to the accompanying drawings. The suffixes "module" and "unit" used in the description below are given or used together only in consideration of ease in preparation of the specification and do not have distinctive meanings or functions.

In describing embodiments, when an element is referred to as being "on (over)" or "under (below)", "before (in front of)", or "after (behind)", this includes the meaning that two elements directly contact each other or one or more other elements are disposed between two elements.

Additionally, in describing the components of the present disclosure, terms like first, second, A, B, (a), and (b) are used. These are solely for the purpose of differentiating one component from another, and one of ordinary skill would understand that the terms do not imply or suggest the substances, order or sequence of the components. If a component is described as "connected", "coupled", or "linked" to another component, one of ordinary skill in the art would understand that the components are not necessarily directly "connected", "coupled", or "linked" but also are indirectly "connected", "coupled", or "linked" via a third component.

The term "comprises", "includes", or "has" described herein should be interpreted not to exclude other elements but to further include such other elements since the corresponding elements may be inherent unless mentioned otherwise. All terms including technical or scientific terms have the same meanings as generally understood by a person having ordinary skill in the art to which the present disclosure pertains unless mentioned otherwise. Generally used terms, such as terms defined in a dictionary, should be interpreted to coincide with meanings in the related art from the context. Unless obviously defined in the present disclosure, such toms are not interpreted as having ideal or excessively formal meanings.

An embodiment of the present disclosure provides a card-type smart key for waking a touch sensor using an input means such as a button included therein and performing an RKE function using the awoken touch sensor, and a control method thereof. According to an embodiment of the present disclosure, functions may be added to an input means such as a button and a sensor in the card-type smart key. In addition, the entire thickness of the smart key is not increased that much by disposing the button and the sensor at one side of the card-type smart key and thus portability of the smart key is improved, so that advantages of the card-type smart key can be maintained.

Figure 3:
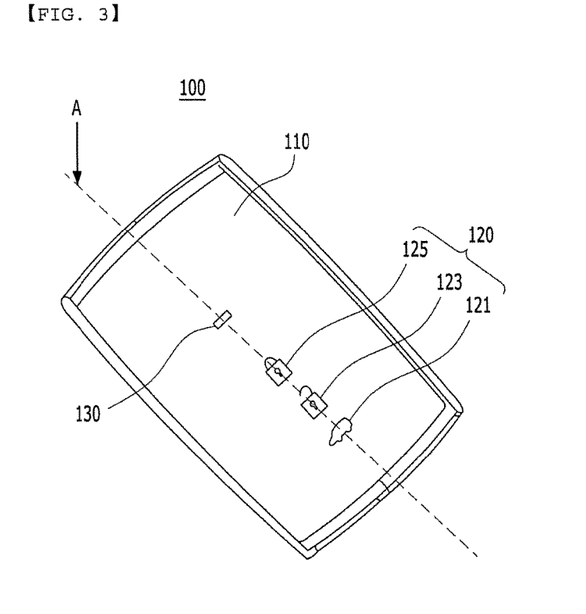
FIGS. 3 to 5 are perspective views of a card-type smart key according to an embodiment of the present disclosure.
Figure 4:
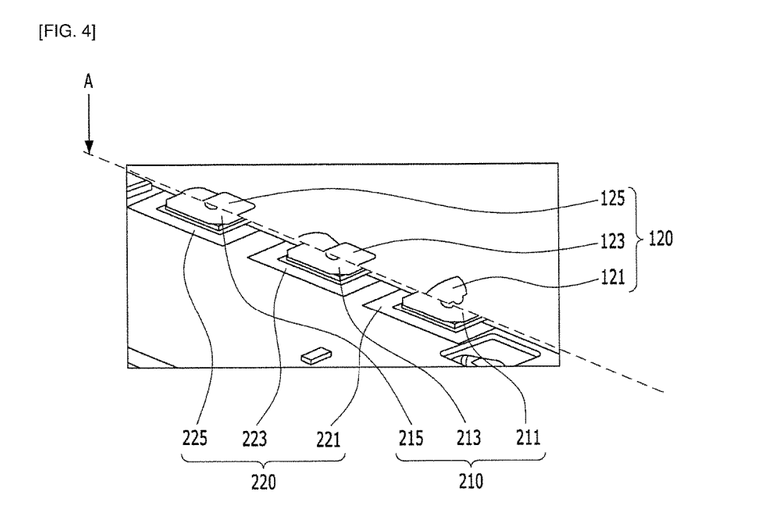
Figure 5:
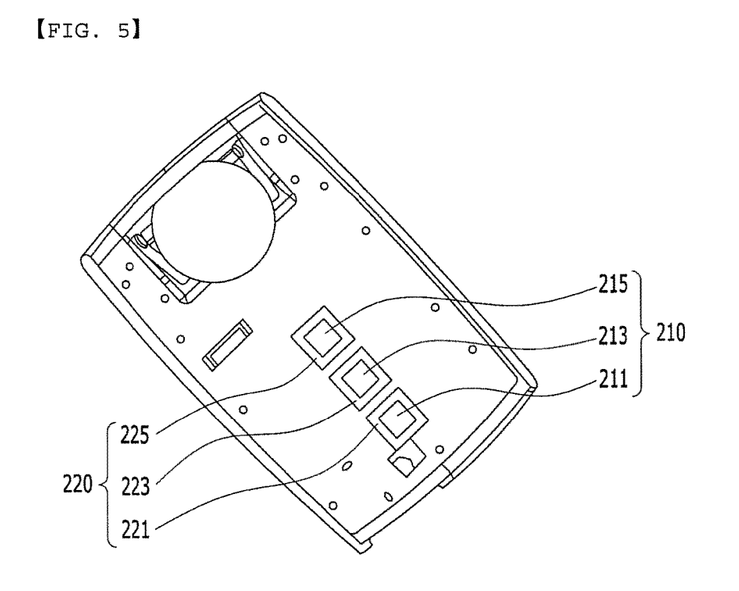

FIGS. 3 to 5 are views illustrating the structure of a card-type smart key 100 according to an embodiment of the present disclosure.

Referring to FIG. 3, the card-type smart key 100 may include a smart key cover 110.

On the smart key cover 110 may be disposed a symbol 120 for performing a remote keyless entry (RKE) function. The symbol 120 may include a plurality of symbols 121, 123, and 125 corresponding to respective functions. The symbol 120 may be an icon corresponding to at least one function of door lock, door unlock, and trunk open.

If a plurality of symbols 120 is disposed, the symbols 120 may be disposed in the form of patterns separated from each other by a predetermined distance on the smart key cover 110.

An indicator 130 may be disposed at the upper side of the smart key cover 110. The indicator 130 may indicate whether there is a control signal corresponding to an RKE function, strength of the control signal is, or whether the RKE function is operating.

The indicator may use a light-emitting device to indicate the operating state of the RKE function, etc.

FIG. 4 is a perspective view of the card-type smart key from which a partial component of the smart key cover 110 is removed based on direction A shown in FIG. 3.

Referring to FIG. 4, the card-type smart key 100 may include a button 210 and a touch sensor 220 therein.

The button 210 may be disposed under the symbol 120 disposed on the smart key cover 110. One or more buttons 210 and one or more touch sensors 220 may be disposed under the symbol 120. The buttons 210 are disposed in correspondence to the number of symbols 120 and each button 210 may be disposed under the symbol 120 according to each function.

The buttons 210 may be equal in number to the symbols 120 disposed on the smart key cover 110.

At least one touch sensor 220 may be disposed around at least one button 210. The touch sensor 220 may be disposed around the button 210 at a preset distance. For example, when a first button 211, a second button 213, and a third button 215 are disposed in the card-type smart key 100, a touch sensor 221, a second sensor 223, and a third touch sensor 225 corresponding respectively to the first button 211, the second button 213, and the third button 215 may be disposed.

FIG. 5 is a view illustrating the inner structure of the card-type smart key 100.

Referring to FIG. 5, the button 210 may be a mechanical button type. The button 210 may be a push button, desirably, a tact button, depressing of which can be identified through tactile feedback. The button 210 may be disposed on a PCB included inside the card-type smart key 100. When a plurality of buttons 210 is disposed, the buttons 210 may be separated from each other by a predetermined distance.

For example, when a user inputs the first button 211 (e.g., through a depressing operation with the finger of the user), the predetermined distance may be a distance secured not to depress another button adjacent to the first button 211. The predetermined distance can prevent an error caused by simultaneous input of a plurality of buttons.

The touch sensor 220 may be a sensor operating based on a capacitive sensing type. The touch sensor 220 may be in at least one form of a touch film, a touch sheet, and a touch pad. The touch sensor 220 may be configured to convert variation in pressure applied to a specific part or capacitance generated at a specific position into an electrical input signal. The touch sensor 220 may sense a voltage corresponding to user input based on the electrical input signal.

The touch sensor 220 may be disposed surrounding the button 210. The touch sensor 220 may be formed in a preset type. For example, the touch sensor 220 may be a square type surrounding the button 210.

The touch sensor 220 may be disposed on a PCB. In this case, the touch sensor 220 may have the same dimensions as the button 210. That is, the touch sensor 220 may be disposed such that, when the user depresses the button 210, the touch sensor 220 in the vicinity of the button 210 can receive the touch input by the depressing operation.

Figure 6:
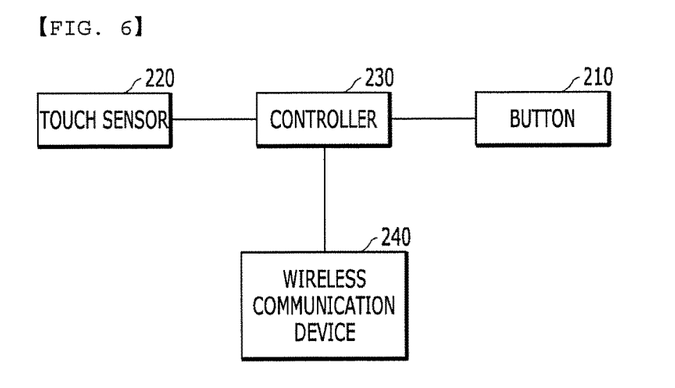
FIG. 6 is a block diagram illustrating the structure of the card-type smart key according to an embodiment of the present disclosure.

FIG. 6 is a block diagram illustrating the structure of the card-type smart key.

The card-type smart key 100 may include the button 210, the touch sensor 220, a controller 230, and a wireless communication device 240.

The controller 230 is an electric circuitry that executes instructions of software which thereby performs various functions described hereinafter.

Upon receiving user input, the button 210 may transmit an input signal to the controller 230. The input signal may include a time period during which input of the button 210 continues according to the user input.

The card-type smart key 100 may include a plurality of buttons 211, 213, and 215. If the buttons 211, 213, and 215 are simultaneously depressed, the buttons 211, 213, and 215 may transmit a plurality of input signals to the controller 230.

The touch sensor 220 may receive a user pattern for generating various control signals for controlling operation of a vehicle.

The touch sensor 220 may be woken by input of the button 210 by the user. If the touch sensor 220 is woken up, the touch sensor 220 may transmit a voltage value sensed by the touch sensor 220 to the controller 230. The touch sensor 220 may include a plurality of touch sensors (e.g., 221, 222, and 223). The touch sensors 221, 222, and 223 may sense touch signals sensed therefrom, respectively.

The controller 230 may control overall operation of the card-type smart key 100.

In a state in which manipulation of at least one of the buttons 211, 213, and 215 is sensed, if touch is sensed by the touch sensor 220 disposed around the manipulated button, the controller 230 may perform a function corresponding to the button manipulation. The controller 230 may generate control signals corresponding to signals input through the button 210 and the touch sensor 220 of the card-type smart key 100.

The controller 230 may receive an input signal from the button 210 and generate a control signal for waking the touch sensor 220.

For example, upon receiving input of the first button 211 through the button 210, the controller 230 may generate a control signal for waking the first touch sensor 221 corresponding to the first button 211.

The controller 230 may determine the number of input signals received from the button 210.

For example, upon receiving input signals from a plurality of buttons of the button 210, the controller 230 may cancel the input signals received from the buttons. When the input signals are canceled, the controller 230 may not wake the touch sensor 220 corresponding to the button 210.

The controller 230 may determine a filtering time of an input signal received from the button 210. The filtering time may be a preset time during which the controller 230 can cancel input of the button 210.

For example, upon receiving an input signal from the button 210 for a time less than the preset time, the controller 230 may cancel the input signal of the button 210. If the input signal is cancelled, the controller 230 may not wake the touch sensor 220 corresponding to the button 210.

The controller 230 may receive voltage values sensed by the touch sensor 220 from the touch sensor 220.

The controller 230 may determine a voltage difference between voltage values based on the sensed voltage values. The controller 230 may include a micro controller unit (MCU) for updating the voltage difference of the touch sensor 220 during every operation.

The controller 230 may determine whether a voltage value received from the touch sensor 220 is changed in comparison with a threshold value.

For example, if the voltage value sensed by the touch sensor 220 is not changed in comparison with the threshold value, the controller 230 may cancel input of the voltage value received from the touch sensor 220.

As another example, if a voltage value around a sensor is changed according to temperature variation, the controller 230 may determine that there is no a constant pattern. If it is determined that there is no constant pattern, the controller 230 may cancel input of the voltage value received from touch sensor 220.

If the voltage value received from the touch sensor 220 is increased to more than the threshold value, the controller 230 may determine that there is a specific pattern.

For example, upon determining that there is a specific pattern according to variation of the voltage value, the controller 230 may generate a control signal according to an RKE function corresponding to the touch sensor 220 sensing the voltage value of the specific pattern.

For example, upon receiving two input signals corresponding to door opening within three seconds from the touch sensor 220 and determining these input signals as a specific pattern, the controller 230 may generate a control signal corresponding to trunk opening according to the pattern.

For example, if it is determined that there is no specific pattern in variation of the voltage value, the controller 230 may cancel input of the voltage value received from the touch sensor 220.

The controller 230 may determine input of the touch sensor 220 according to incorrect manipulation of the card-type smart key 100.

For example, when there is variation in the voltage value around a sensor according to variation in temperature, the controller 230 may determine whether variation in the voltage value has a specific pattern.

For example, upon generating input caused by a non-dielectric material, the controller 230 may receive voltage values around touch sensors, measure variation in the voltage values, and determine whether that variation of the voltage value has a specific pattern.

If an RKE function is performed, the controller 230 may cancel input of the button 210 corresponding to the RKE operation.

If input of the button 210 is canceled, the controller 230 may determine whether there is a button 210 which is not depressed by the user.

If it is determined that there is no button 210 which is not depressed, the controller 230 may set the touch sensor 220 to a power saving state.

If it is determined that there is a button 210 which is not depressed, the controller 230 may generate a control signal to sense the voltage value of the touch sensor 220 around the button 210 which is not depressed. The controller 230 may receive the voltage value and set the voltage value as a threshold value for the next operation.

The wireless communication device 240, a hardware device implemented with various electronic circuits to transmit and receive signals via wireless connections, may transmit a vehicle control signal generated by user input by the controller 230 to a vehicle. The wireless communication device 240 may include one or more communication modules for performing communication with the vehicle. For example, the wireless communication device 240 may perform communication using a radio frequency (RF) scheme.

Figure 7:
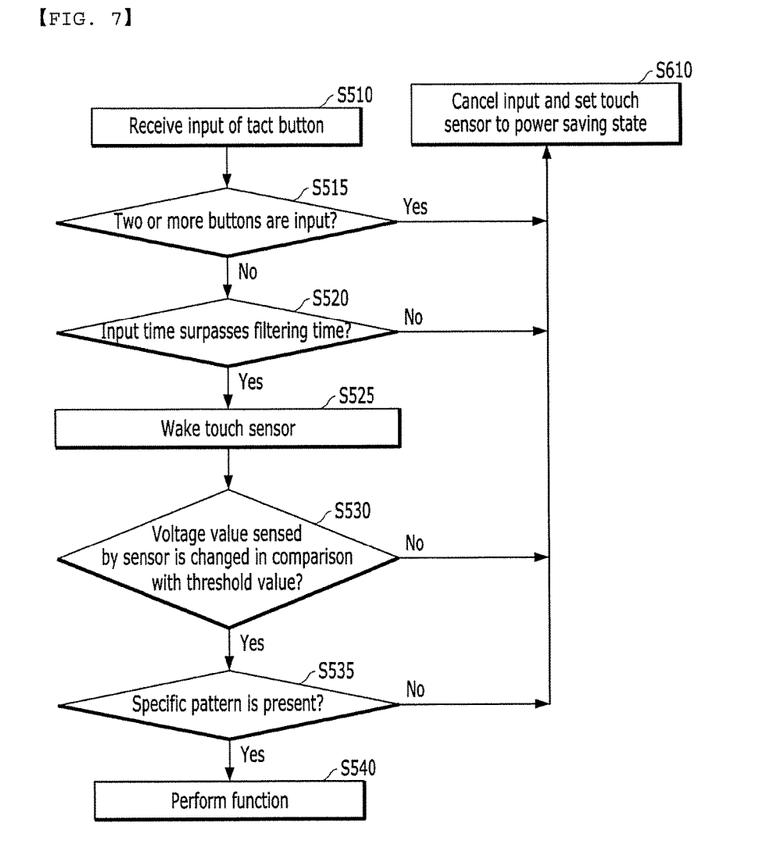
FIGS. 7 and 8 are flowcharts illustrating a card-type smart key control method according to an embodiment of the present disclosure.
Figure 8:
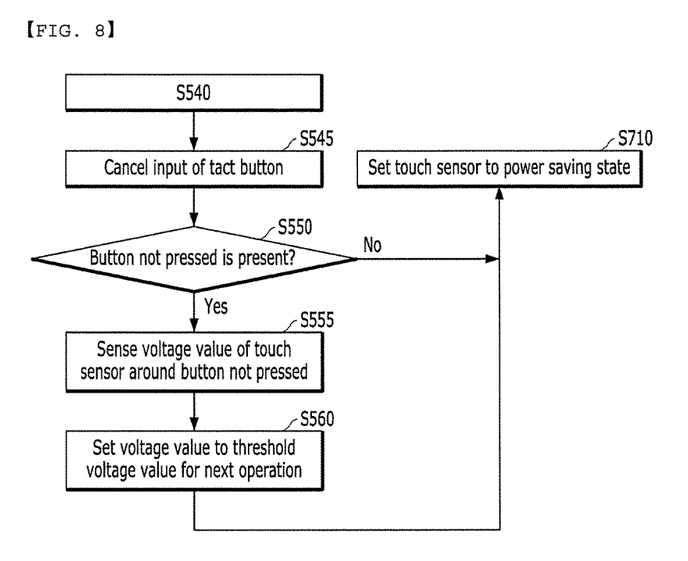

FIGS. 7 and 8 are flowcharts illustrating a card-type smart key control method.

Referring to FIGS. 7 and 8, the controller 230 may receive input of the button 210 (S510).

Upon receiving input of the button 210, the controller 230 may determine whether plural buttons 210 are input (S515).

Upon determining that the plural buttons 210 are input, the controller 230 may cancel input signals received from the buttons 210 and (S610).

Upon determining that only one button 210 is input, the controller 230 may check a time during which the button 210 is input. The controller 230 may determine whether the input time of the button 210 surpasses a filtering time (S520). Upon determining that the input time of the button 210 does not surpass the filtering time, the controller 230 may cancel an input signal received from the button 210 (S610).

Upon determining that the button 210 is input for a preset time, the controller 230 may wake the touch sensor 220 (S525).

The controller 230 may receive a voltage value from the touch sensor 220. The controller 230 may determine whether the voltage value sensed by the touch sensor 220 is changed in comparison with a threshold value (S530). Upon determining that the voltage value is not changed, the controller 230 may cancel input of the voltage value received from the touch sensor 220 (S610).

Upon determining that the voltage value is changed, the controller 230 may determine whether variation in the voltage value has a specific pattern (S535). Upon determining that there is no the specific pattern, the controller 230 may cancel input of the voltage value received from the touch sensor 220 (S610).

Upon determining that there is a specific pattern, the controller 230 may activate a function corresponding to the touch sensor 220 which senses the voltage value of the specific pattern (S540).

If the function is activated, the controller 230 may cancel input of the button 210 (S545).

If input of the button 210 is cancelled, the controller 230 may determine whether there is a button 210 which is not depressed by the user (S550).

Upon determining that there is a button 210 which is not depressed, the controller 230 may generate a control signal so as to sense the voltage value of the touch sensor 220 around the button 210 which is not depressed (S555). Upon determining that there is no button 210 which is not depressed, the controller 230 may set the touch sensor to a power saving state (S710).

The controller 230 may receive the voltage value and set the voltage value to a threshold value for the next operation (S560).

The card-type smart key and the control method thereof according to the present disclosure have the following effects.

Firstly, higher merchantability can be obtained by providing an RKE function for remotely controlling a vehicle door by applying a button as well as a passive function for controlling the vehicle door only by a button of a vehicle.

Secondly, a problem caused by incorrect operation due to the structure of the card-type smart key when a physical button is simply applied can be solved by an additional sensor and the lifetime of a battery can be secured by not causing a sensor to be continuously operated.

It will be appreciated by persons skilled in the art that that the effects that can be achieved through the present disclosure are not limited to what has been particularly described hereinabove and other advantages of the present disclosure will be more clearly understood from the above detailed description.

The method according to the above-described embodiment may be implemented as a computer-executable program that can be recorded in a computer-readable medium. Examples of the computer-readable medium include a read only memory (ROM), a random access memory (RAM), a compact disc (CD)-ROM, a magnetic tape, a floppy disk, an optical data storage, and a carrier wave (e.g., data transmission over the Internet). The computer-readable recording medium can be distributed over a computer system connected to a network so that computer-readable code is written thereto and executed therefrom in a decentralized manner. Functional programs, code, and code segments needed to realize the above-described method can be easily derived by programmers skilled in the art.

Those skilled in the art will appreciate that the present disclosure may be embodied in other specific forms than those set forth herein without departing from the spirit and essential characteristics of the present disclosure.

What is claimed is:

1. A card-type smart key comprising:
   at least one button;
   at least one touch sensor disposed around the at least one button; and
   a controller for receiving at least one input from the at least one button and the at least one touch sensor,
   wherein, upon sensing manipulation of any one of the at least one button and then sensing a touch from a touch sensor disposed around the manipulation-sensed button, the controller performs a function corresponding to the manipulation, and wherein the controller wakes the at least one touch sensor corresponding to the at least one button when input through the at least one button satisfies a preset condition.

2. The card-type smart key according to claim 1, wherein the at least one button is disposed under a symbol according to each function.

3. The card-type smart key according to claim 1, wherein, if the at least one button are plural buttons, the plural buttons are separated from each other by a preset distance.

4. The card-type smart key according to claim 1, wherein the at least one touch sensor is disposed surrounding the at least one button.

5. The card-type smart key according to claim 4, wherein the at least one touch sensor has dimensions identical to dimensions of the at least one button.

6. The card-type smart key according to claim 1, wherein the at least one touch sensor is a capacitive touch sensor.

7. The card-type smart key according to claim 6, wherein the at least one touch sensor is disposed to sense a voltage value of a touch sensor around the at least one button when the at least one button is input.

8. The card-type smart key according to claim 1, wherein the controller receives a voltage sensed by the wakened touch sensor and determines input of a user based on the sensed voltage.

9. A method of controlling a card-type smart key, comprising:
    receiving user input from at least one button;
    receiving at least one input from the at least one button and at least one touch sensor;
    upon sensing manipulation of any one of the at least one button and then sensing a touch from a touch sensor disposed around the manipulation-sensed button, performing, by a controller, a function corresponding to the manipulation; and
    if the at least one input from the at least one button is received, determining, by the controller, whether an input time surpasses a preset filtering time.

10. The method according to claim 9, further comprising, if the at least one button are plural buttons, determining, by the controller, whether inputs from the plural buttons are simultaneously received.

11. The method according to claim 9, further comprising determining, by the controller, whether a voltage value sensed by the at least one touch sensor is changed to a preset threshold value or more.

12. The method according to claim 11, further comprising determining, by the controller, whether the voltage value sensed by the at least one touch sensor is changed to a specific pattern.

13. The method according to claim 9, further comprising cancelling, by the controller, the at least one input of the at least one button upon generating a control signal for performing the function.

14. The method according to claim 13, further comprising, upon cancelling the at least one input of the at least one button, receiving, by the controller, a voltage value from the at least one touch sensor around a button which is not pressed.

15. The method according to claim 14, further comprising setting, by the controller, the voltage value sensed by the at least one touch sensor to a threshold value for a next operation.

16. The method according to claim 15, further comprising setting, by the controller, the at least one touch sensor to a power saving state when there is no button that is not pressed.

17. A non-transitory computer-readable recording medium in which a program for executing the method of controlling a card-type smart key according to claim 9 is recorded.

* * * * *